United States Patent
Hiyoshi

(10) Patent No.: US 12,332,763 B2
(45) Date of Patent: Jun. 17, 2025

(54) IMAGE FORMING APPARATUS AND CONTROL METHOD

(71) Applicant: Toshiba Tec Kabushiki Kaisha, Tokyo (JP)

(72) Inventor: Kimihiko Hiyoshi, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/447,420

(22) Filed: Aug. 10, 2023

(65) Prior Publication Data

US 2025/0053494 A1    Feb. 13, 2025

(51) Int. Cl.
  G06F 11/00    (2006.01)
  G03G 15/00    (2006.01)
  G06F 11/07    (2006.01)
  G06F 11/34    (2006.01)
  H04N 1/32     (2006.01)

(52) U.S. Cl.
  CPC ......... *G06F 11/3476* (2013.01); *G03G 15/55* (2013.01); *G03G 15/70* (2013.01); *G06F 11/0733* (2013.01); *H04N 1/32694* (2013.01)

(58) Field of Classification Search
  CPC .... G03G 15/5079; G03G 15/55; G03G 15/70; G06F 11/0733; G06F 11/0766; G06F 11/3476; H04N 1/00037; H04N 1/32609; H04N 1/32694
  See application file for complete search history.

(56) References Cited

U.S. PATENT DOCUMENTS

| | | | |
|---|---|---|---|
| 8,023,125 B2 | 9/2011 | Yamanaka | |
| 2011/0299109 A1* | 12/2011 | Kamisuwa | H04N 1/32609 358/1.14 |
| 2022/0311873 A1* | 9/2022 | Isaka | G06F 11/0733 |

FOREIGN PATENT DOCUMENTS

| | | |
|---|---|---|
| JP | 2000-177219 A | 6/2000 |
| JP | 2005-026789 A | 1/2005 |

* cited by examiner

*Primary Examiner* — Sophia S Chen
(74) *Attorney, Agent, or Firm* — FOLEY & LARDNER LLP

(57) ABSTRACT

An image forming apparatus includes a storage device and a processing circuit. The storage device is configured to store a malfunction log in the image forming apparatus. The processing circuit is configured to control, if a job includes an operation relating to the malfunction log, a start timing of at least one of the operation and a next operation following the operation in the job.

16 Claims, 7 Drawing Sheets

FIG. 3

| | PRINTING RATIO | DUPLEX/ SIMPLEX | PAPER SIZE | PAPER THICKNESS | POSITION OF PAPER FEED CASSETTE | PAPER DISCHARGE DESTINATION | INTERNAL TEMPERATURE | INTERNAL HUMIDITY |
|---|---|---|---|---|---|---|---|---|
| 1 | | | | | | | | |
| 2 | | | | | | | | |
| ... | | | | | | | | |

FIG. 6

| | MODEL INFORMATION | USAGE INFORMATION | PRINTING RATIO | DUPLEX / SIMPLEX | PAPER SIZE | PAPER THICKNESS | POSITION OF PAPER FEED CASSETTE | PAPER DISCHARGE DESTINATION | INTERNAL TEMPERATURE | INTERNAL HUMIDITY |
|---|---|---|---|---|---|---|---|---|---|---|
| 1 | | | | | | | | | | |
| 2 | | | | | | | | | | |
| ... | | | | | | | | | | |

IMAGE FORMING APPARATUS AND CONTROL METHOD

FIELD

Embodiments relate to an image forming apparatus and a control method.

BACKGROUND

In an image forming apparatus, if plural sheets of paper are printed, not only a sheet of paper that is being printed but also the next sheet of paper following the paper that is being printed are conveyed in the apparatus. Therefore, the image forming apparatus simultaneously conveys two or more sheets of paper in the apparatus. Here, in the image forming apparatus, if error such as a jam occurs as a malfunction during printing, the operation stops. In the apparatus, the sheets of paper that are being conveyed remain due to the stop of the operation.

To resolve the error, a user needs to remove all the sheets of paper remaining in the apparatus that are being conveyed. That is, the user needs to remove not only a sheet of paper remaining in a position that causes a jam but also a sheet of paper remaining in a position other than the position that causes a jam. The sheet of paper remaining in the apparatus may be pressed by a roller or may be jammed in a paper feed cassette.

As such, due to the occurrence of malfunction in the image forming apparatus, the operation of the image forming apparatus may stop, a workload of removing the sheet of paper may be applied to the user, or the sheet of paper may be wasted.

DESCRIPTION OF THE DRAWINGS

FIG. 3 is a diagram illustrating the summary of a data structure of data stored in the image forming apparatus;

FIG. 6 is a diagram illustrating the summary of a data structure of data stored in a server.

DETAILED DESCRIPTION

In general, according to at least one embodiment, an image forming apparatus includes a storage device and a processing circuit. The storage device is configured to store a malfunction log in the image forming apparatus. The processing circuit is configured to control, if a job includes an operation relating to the malfunction log, a start timing of at least one of the operation and a next operation following the operation in the job.

Hereinafter, some embodiments will be described with reference to the drawings. In each of the drawings used for the description of the embodiment, the scale of each of components may be appropriately changed. Each of the drawings in the following embodiment may not illustrate a configuration for description.

First Embodiment

A configuration example of an image forming apparatus will be described.

For example, the image forming apparatus is a multifunction peripheral (MFP).

Figure 1:
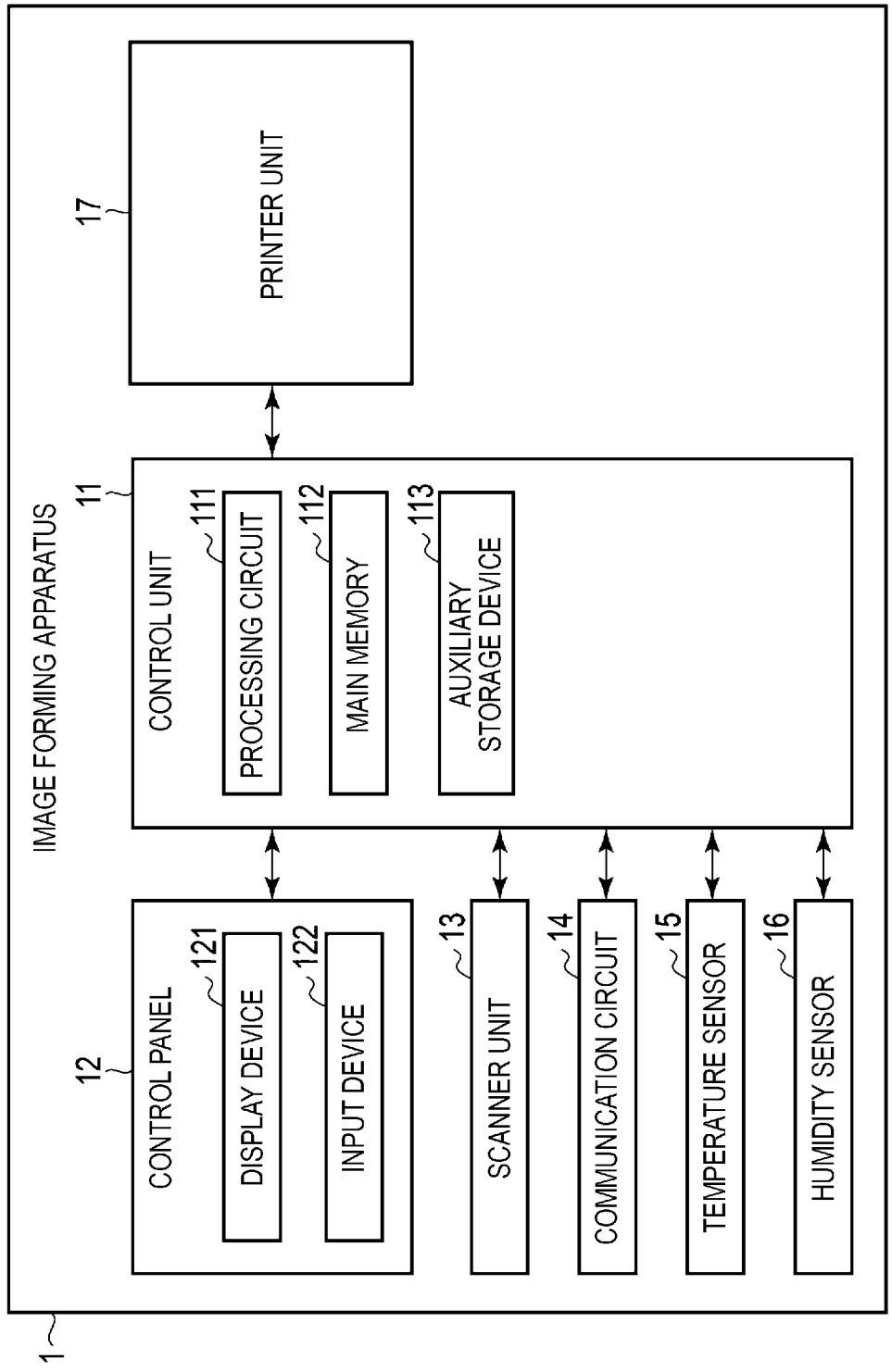
FIG. 1 is a block diagram illustrating the summary of a configuration example of an image forming apparatus according to a first embodiment.

FIG. 1 is a block diagram illustrating the summary of a configuration example of an image forming apparatus 1.

The image forming apparatus 1 includes a control unit 11, a control panel 12, a scanner unit 13, a communication circuit 14, a temperature sensor 15, a humidity sensor 16, and a printer unit 17.

The control unit 11 controls operations of the various units in the image forming apparatus 1. The control unit 11 includes a processing circuit 111, a main memory 112, and an auxiliary storage device 113.

The processing circuit 111 corresponds to a central part of the image forming apparatus 1. The processing circuit 111 is an element configuring a computer of the image forming apparatus 1. The processing circuit 111 includes at least one processor such as a central processing unit (CPU). In addition to or instead of the CPU, the processing circuit 111 may include an application specific integrated circuit (ASIC), a field programmable gate array (FPGA), or a graphics processing unit (GPU). The processing circuit 111 loads a program stored in advance in the main memory 112 or the auxiliary storage device 113 on the main memory 112. The processing circuit 111 executes various processes by executing the program loaded on the main memory 112.

The main memory 112 corresponds to a main storage part of the image forming apparatus 1. The main memory 112 is an element configuring the computer of the image forming apparatus 1. The main memory 112 includes a nonvolatile memory area and a volatile memory area. The main memory 112 stores an operating system or a program in the nonvolatile memory area. The main memory 112 uses the volatile memory area as a area work where data is appropriately rewritten by the processing circuit 111. For example, the main memory 112 includes a read only memory (ROM) as the nonvolatile memory area. For example, the main memory 112 includes a random access memory (RAM) as the volatile memory area.

The auxiliary storage device 113 corresponds to an auxiliary storage part of the image forming apparatus 1. For example, the auxiliary storage device 113 includes a hard disk drive (HDD). In addition to or instead of the HDD, the auxiliary storage device 113 may include a semiconductor storage medium such as a solid state drive (SSD). The auxiliary storage device 113 stores the above-described program, data used for the processing circuit 111 to execute various processes, and data generated during processes of the processing circuit 111. The auxiliary storage device 113 is an example of a storage device.

The auxiliary storage device 113 stores one or more malfunction logs in the image forming apparatus 1. Hereinafter, the malfunction log in the image forming apparatus 1 will also be simply referred to as the malfunction log. The malfunction log is data representing occurrence conditions of malfunction in the image forming apparatus 1. The malfunction in the image forming apparatus 1 is an event that causes the image forming apparatus 1 to stop a printing operation. The printing operation is an example of an operation of the image forming apparatus 1. The malfunction is error such as a jam but is not limited thereto. For example, the jam may occur during duplex printing of an image having a high printing ratio such as double-sided solid images.

For example, the occurrence conditions are conditions of the printing operation if the malfunction occurs. The occurrence conditions may include at least one condition among a printing ratio, duplex/simplex printing, a paper size, a paper thickness, a position of a paper feed cassette, a paper discharge destination, an internal temperature, and an internal humidity. The occurrence conditions may include one or more conditions other than the above-described conditions. The paper is an example of a sheet on which an image is to be printed.

The printing ratio refers to a ratio of a portion where an image is to be printed in one page. The state of a printed sheet of paper varies depending on the height of the printing ratio. Therefore, the printing ratio may be a condition that affects the occurrence of the malfunction.

The duplex/simplex printing depends on whether an image of another page is to be printed on the sheet of paper on which an image of one page is to be printed. A conveyance path of paper in the image forming apparatus 1 varies depending on whether to execute duplex printing or simplex printing. Therefore, the duplex/simplex printing may be a condition that affects the occurrence of the malfunction.

The paper size is a size of the sheet of paper on which an image of one page is to be printed. The state of a printed sheet of paper varies depending on the paper size. Therefore, the paper size may be a condition that affects the occurrence of the malfunction.

The paper thickness is a thickness of the sheet of paper on which an image of one page is to be printed. The state of a printed sheet of paper varies depending on the paper thickness. Therefore, the paper thickness may be a condition that affects the occurrence of the malfunction.

The position of the paper feed cassette is a position of the paper feed cassette that accommodates the sheet of paper on which an image of one page is to be printed among a plurality of paper feed cassettes. The conveyance path of paper in the image forming apparatus 1 varies depending on the position of the paper feed cassette. Therefore, the position of the paper feed cassette may be a condition that affects the occurrence of the malfunction.

The paper discharge destination is a destination to which the sheet of paper on which an image of one page is to be printed is discharged. The conveyance path of paper in the image forming apparatus 1 varies depending on the paper discharge destination. Therefore, the paper discharge destination may be a condition that affects the occurrence of the malfunction.

The internal temperature is the internal temperature of the image forming apparatus 1 during the printing operation. The state of paper varies depending on the internal temperature of the image forming apparatus 1. Therefore, the internal temperature may be a condition that affects the occurrence of the malfunction.

The internal humidity is the internal humidity of the image forming apparatus 1 during the printing operation. The state of paper varies depending on the internal humidity of the image forming apparatus 1. Therefore, the internal humidity may be a condition that affects the occurrence of the malfunction.

The processing circuit 111 can acquire a printing ratio of one page based on image data of one page. The processing circuit 111 can acquire the duplex/simplex printing, the paper size, the paper thickness, the position of the paper feed cassette, and the paper discharge destination regarding a job based on setting by a user. The processing circuit 111 can acquire the internal temperature based on detection of the temperature by the temperature sensor 15. The processing circuit 111 can acquire the internal humidity based on detection of the humidity by the humidity sensor 16. The processing circuit 111 stores the malfunction log in the auxiliary storage device 113 based on the occurrence of the malfunction in the image forming apparatus 1.

The control panel 12 includes a display device 121 and an input device 122.

The display device 121 is a device that can display an image. The display device 121 is, for example, a liquid crystal display or an organic electroluminescence (EL) display and is not limited thereto.

The input device 122 is a device capable of inputting an instruction based on a user operation. The input device 122 may include a pressable button. The input device 122 may include a touch panel that is integrated with the display device 121.

The scanner unit 13 is a device that reads a text or an image such as a figure or a picture that is drawn on paper placed at a predetermined position. The scanner unit 13 includes a line sensor. The line sensor may be a charge coupled device (CCD) type. The line sensor may be a contact image sensor (CIS) type. The scanner unit 13 generates image data based on the image read using the line sensor. The scanner unit 13 transmits the generated image data to the control unit 11. The control unit 11 stores the received image data in the auxiliary storage device 113 or transmits the received image data to the printer unit 17.

The communication circuit 14 is an interface where the image forming apparatus 1 communicates with another device such as a personal computer (PC) or a server via a network. The network includes one or more networks among various networks such as the Internet, a mobile communication network, or a local area network (LAN). The LAN may be a wireless LAN or a wired LAN. The communication circuit 14 is an example of a communication interface.

The temperature sensor 15 is a sensor that detects the internal temperature of the image forming apparatus 1.

The humidity sensor 16 is a sensor that detects the internal humidity of the image forming apparatus 1.

The printer unit 17 is a unit that prints an image on paper. Using a printing function, the printer unit 17 prints an image on paper based on image data per page transmitted from a PC via the communication circuit 14. Using a copying function, the printer unit 17 prints an image on paper based on image data per page generated by the scanner unit 13.

Figure 2:
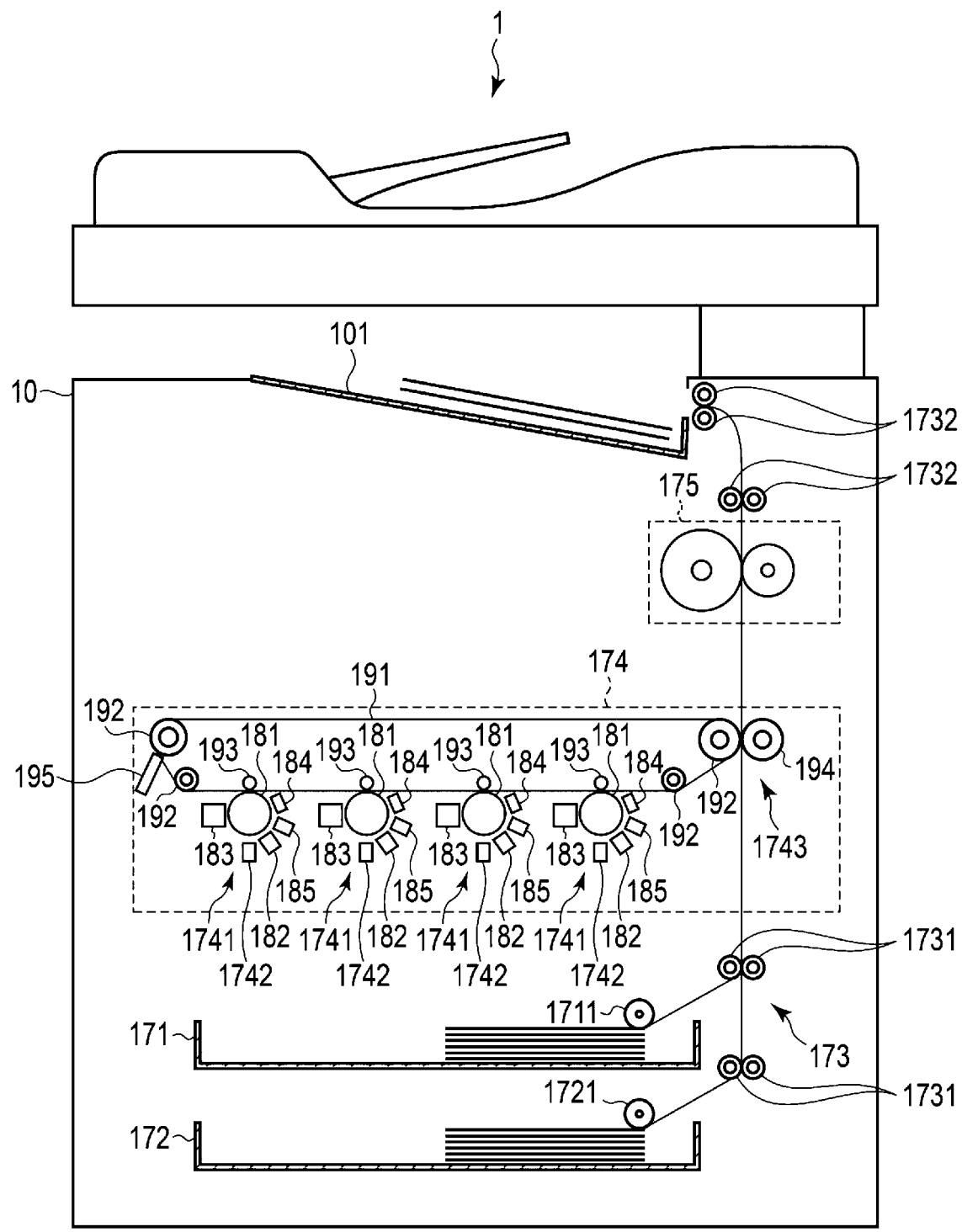
FIG. 2 is a diagram illustrating the summary of a configuration example of a printer unit.

FIG. 2 is a diagram illustrating the summary of a configuration example of the printer unit 17.

The image forming apparatus 1 includes a housing 10 and a paper discharge tray 101. The paper discharge tray 101 is a tray that supports paper that is printed by the printer unit 17 and discharged from the image forming apparatus 1.

The printer unit 17 includes a paper feed cassette 171, a paper feed cassette 172, a conveying unit 173, an image forming unit 174, and a fixing unit 175. FIG. 2 illustrates two paper feed cassettes. However, the number of paper feed cassettes is not limited to two.

The paper feed cassette 171 can be drawn out from the housing 10. The paper feed cassette 171 accommodates paper. The paper feed cassette 171 includes a pickup roller 1711. The pickup roller 1711 picks up sheets of paper from the paper feed cassette 171 one by one. The pickup roller 1711 supplies the picked paper to the conveying unit 173.

The paper feed cassette 172 can be drawn out from the housing 10. The paper feed cassette 172 accommodates paper. The paper feed cassette 172 may accommodate sheets of paper having a size different from the sheets of paper accommodated in the paper feed cassette 171. The paper feed cassette 172 includes a pickup roller 1721. The pickup roller 1721 picks up sheets of paper from the paper feed cassette 172 one by one. The pickup roller 1721 supplies the picked paper to the conveying unit 173.

The conveying unit 173 is a mechanism that conveys paper in the image forming apparatus 1. The conveying unit 173 includes a plurality of rollers 1731 that supply the paper picked up by the pickup roller 1711 or the pickup roller 1721 to the image forming unit 174. The conveying unit 173 is provided downstream of the fixing unit 175 and includes a plurality of rollers 1732 that discharge the paper printed by the printer unit 17 to the paper discharge tray 101.

The image forming unit 174 forms an image on paper to print the image on the paper. The image forming unit 174 includes a plurality of process units 1741, a plurality of exposure units 1742, and a transfer mechanism 1743. The plurality of process units 1741 correspond to toners of cyan, magenta, yellow, and black, respectively. The image forming unit 174 includes the exposure units 1742 for each of the process units 1741. The plurality of process units 1741 have the same configuration. The plurality of exposure units 1742 have the same configuration. Therefore, hereinafter, one process unit 1741 and one exposure unit 1742 will be described respectively.

The process unit 1741 forms a toner image on a surface of a photoconductive drum 181. The process unit 1741 includes the photoconductive drum 181, a charging unit 182, a developing unit 183, a photoconductor cleaner 184, and a charge eraser 185.

The photoconductive drum 181 is a photoconductor including a cylindrical drum and a photosensitive layer that is formed on an outer circumferential surface of the drum. The photoconductive drum 181 rotates at a predetermined speed. The charging unit 182 uniformly charges a photoreceptor layer on the surface of the photoconductive drum 181. The developing unit 183 is a device that contains a developer containing a toner and a magnetic carrier. The developing unit 183 receives toner supplied from a toner cartridge. The developing unit 183 contains a carrier in advance. The developing unit 183 rotates a developing roller such that the toner in the developer is attached to an electrostatic latent image on the surface of the photoconductive drum 181. As a result, the developing unit 183 forms a toner image the on surface of the photoconductive drum 181. The photoconductor cleaner 184 removes the toner remaining on the surface of the photoconductive drum 181. For example, the photoconductor cleaner 184 includes a blade that contacts with the surface of the photoconductive drum 181, and removes the toner remaining on the surface of the photoconductive drum 181 using the blade. The charge eraser 185 removes electrostatic charges of the photoconductive drum 181.

The exposure unit 1742 irradiates the surface of the photoconductive drum 181 with laser light through an optical system such as a polygon mirror. The exposure unit 1742 forms an electrostatic pattern, by the irradiation, on the surface of the photoconductive drum 181 as the electrostatic latent image.

The transfer mechanism 1743 is configured to transfer the toner images formed on the surfaces of the plurality of photoconductive drums 181 to the paper. The transfer mechanism 1743 includes an intermediate transfer belt 191, a plurality of support rollers 192, a plurality of primary transfer rollers 193, a secondary transfer roller 194, and a transfer cleaner 195.

The intermediate transfer belt 191 is an endless belt. The plurality of support rollers 192 are inside the intermediate transfer belt 191, and support the intermediate transfer belt 191 by a predetermined tensile force from the inside. Each of the plurality of primary transfer rollers 193 faces each of the plurality of photoconductive drums 181 with the intermediate transfer belt 191 interposed therebetween. The primary transfer rollers 193 bring the intermediate transfer belt 191 into contact with the photoconductive drums 181. The primary transfer rollers 193 transfer the toner images formed on the surfaces of the photoconductive drums 181 to the intermediate transfer belt 191 to form a toner image on the intermediate transfer belt 191. The secondary transfer roller 194 faces the support rollers 192 with the intermediate transfer belt 191 interposed therebetween. The secondary transfer roller 194 transfers the toner image formed on the intermediate transfer belt 191 to the paper to form a toner image on the paper. Forming the toner image on the paper is an example of forming an image on the paper. The transfer cleaner 195 includes a blade that contacts with the surface of the intermediate transfer belt 191. The transfer cleaner 195 removes toner remaining in the surface of the intermediate transfer belt 191 using the blade.

The fixing unit 175 applies heat and pressure to the paper on which the toner image supplied from the image forming unit 174 is formed. The fixing unit 175 fixes the toner image formed on the paper to the paper using heat and pressure. For example, the fixing unit 175 includes a heater.

The hardware configuration of the image forming apparatus 1 is not limited to the configuration described above. For the image forming apparatus 1, the components described above can be removed or modified and new components can be added.

FIG. 3 is a diagram illustrating the summary of a data structure of data stored in the image forming apparatus 1.

The auxiliary storage device 113 stores a malfunction log whenever a malfunction occurs in the image forming apparatus 1.

The malfunction log includes the printing ratio, the duplex/simplex printing, the paper size, the paper thickness, the position of the paper feed cassette, the paper discharge destination, the internal temperature, and the internal humidity.

Figure 4:
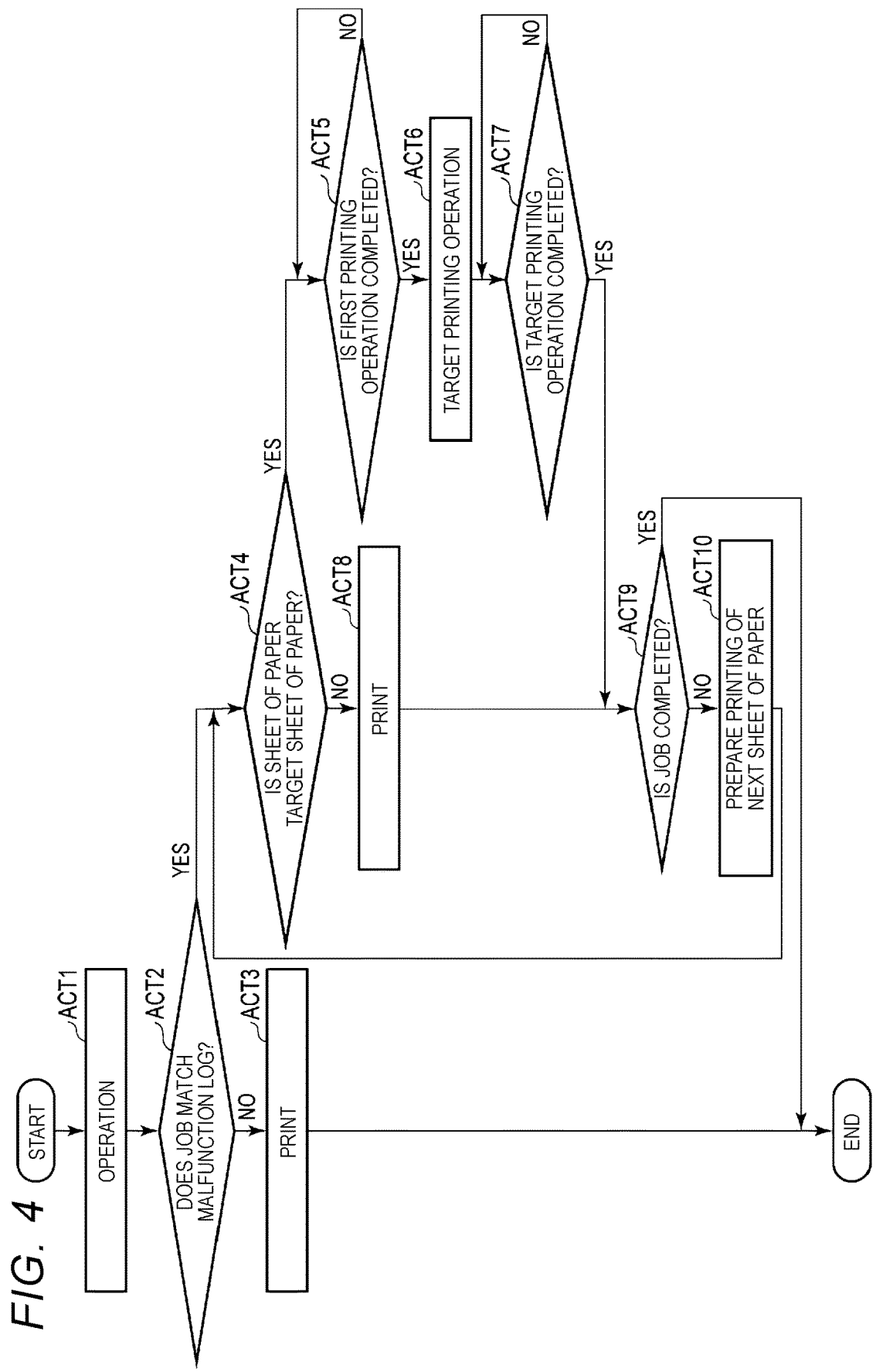
FIG. 4 is a flowchart illustrating an example of a process by the image forming apparatus.

FIG. 4 is a flowchart illustrating an example of a process by the image forming apparatus 1.

The procedure described below is merely exemplary and may be changed as long as each of the processes can be executed. In the procedure described below, steps can be omitted, replaced, and added depending on embodiments.

Here, a process of one job by the processing circuit 111 will be described. The job may be a job for printing an image on the paper using the printing function based on image data per page transmitted from another apparatus via the communication circuit 14. The job may be a job for printing an image on the paper using the copying function based on image data per page generated by the scanner unit 13.

The job includes image data of a plurality of pages and includes a plurality of printing operations for printing images of a plurality of pages on plural sheets of paper. The printing operation is a printing operation for one sheet of paper. The printing operation includes various operations from start of the printing operation to completion of the printing operation.

The printing operation can include pick-up of a sheet of paper before printing by the printer unit 17. The pick-up of the sheet of paper before printing by the printer unit 17 corresponds to the start of the printing operation. The printing operation can include conveyance of a sheet of paper before printing by the printer unit 17. The printing operation can include printing by the printer unit 17. During the simplex printing, the printing by the printer unit 17 is an operation of printing an image of one page on a single surface of the paper. During the duplex printing, the printing by the printer unit 17 is an operation of printing an image of one page on a first surface of the paper and printing an image of the next one page on a second surface of the paper. The printing operation can include conveyance of a sheet of paper printed by the printer unit 17. The printing operation can include discharging the sheet of paper printed by the printer unit 17 to the paper discharge tray 101. The discharge of the sheet of paper printed by the printer unit 17 to the paper discharge tray 101 corresponds to the completion of the printing operation.

The job includes setting for the job by a user based on a user operation. The setting for the job includes setting of the duplex/simplex printing, the paper size, paper thickness, the position of the paper feed cassette, and the paper discharge destination.

The processing circuit 111 acquires the job based on the user operation (ACT 1). In ACT 1, for example, the processing circuit 111 can acquire the job from a PC via the communication circuit 14 based on an operation of the PC by the user. The processing circuit 111 can acquire a job corresponding to a reading process by the scanner unit 13 based on an operation of the input device 122 by the user.

The processing circuit 111 processes whether the job includes a printing operation that matches the malfunction log (ACT 2). The printing operation that matches the malfunction log is a printing operation including printing corresponding to printing conditions that match the malfunction log. The printing conditions matching the malfunction log represents that the printing conditions match the occurrence conditions represented by the malfunction log. The printing operation that matches the malfunction log is an example of a target printing operation. A sheet of paper relating to the target printing operation will be referred to as a target sheet of paper.

In ACT 2, for example, the processing circuit 111 acquires printing conditions per page based on the acquisition of the job. The printing conditions are conditions of the printing operation. The printing conditions may include at least one condition among the printing ratio, the duplex/simplex printing, the paper size, the paper thickness, the position of the paper feed cassette, the paper discharge destination, the internal temperature, and the internal humidity. The printing conditions may include one or more conditions other than the above-described conditions. The processing circuit 111 can acquire the printing ratio per page based on image data of a plurality of pages in the job. The processing circuit 111 can acquire the duplex/simplex printing, the paper size, the paper thickness, the position of the paper feed cassette, and the paper discharge destination regarding the job based on the setting in the job. The processing circuit 111 can acquire the internal temperature based on detection of the temperature by the temperature sensor 15. The processing circuit 111 can acquire the internal humidity based on detection of the humidity by the humidity sensor 16.

The processing circuit 111 compares the printing conditions per page to one or more malfunction logs stored in the auxiliary storage device 113. If the printing conditions that match the malfunction log are present, the processing circuit 111 determines that the job includes the target printing operation. The job may include one target printing operation or may include a plurality of target printing operations. If the job includes a plurality of target printing operations, the plurality of target printing operations may match one malfunction log or may match different malfunction logs. On the other hand, if the printing conditions that match the malfunction log are not present, the processing circuit 111 determines that the job does not include the target printing operation.

If the job does not include the target printing operation (ACT 2, NO), the process proceeds from ACT 2 to ACT 3. If the job includes the target printing operation (ACT 2, YES), the process proceeds from ACT 2 to ACT 4. In ACT 4 to ACT 10, the processing circuit 111 controls a start timing of at least one of the target printing operation and a next printing operation following the target printing operation in the job.

Hereinafter, a previous printing operation preceding the target printing operation in the job will be referred to as a first printing operation. The first printing operation may be the target printing operation or may not be the target printing operation. A sheet of paper relating to the first printing operation will be referred to as a first sheet of paper. The next printing operation following the target printing operation in the job will be referred to as a second printing operation. The second printing operation may be the target printing operation or may not be the target printing operation. A sheet of paper relating to the second printing operation will be referred to as a second sheet of paper.

If the job does not include the target printing operation, the processing circuit 111 controls the printer unit 17 to execute a plurality of printing operations in the job as usual (ACT 3). The printer unit 17 picks up a sheet of paper relating to the printing operation at a usual timing per printing operation. The usual timing at which the printer unit 17 picks up the sheet of paper may be a timing after pick-up of the previous sheet of paper and before discharge of the previous sheet of paper to the paper discharge tray 101. The printer unit 17 prints an image on the sheet of paper based on image data after the pick-up of the sheet of paper. The printer unit 17 discharges the printed sheet of paper to the paper discharge tray 101.

As such, the printer unit 17 picks up the next sheet of paper during the conveyance of the sheet of paper in the image forming apparatus 1. Therefore, for example, the printer unit 17 simultaneously conveys the printed sheet of paper, the sheet of paper that is being printed, and the sheet of paper before printing in the image forming apparatus 1. However, since the job does not include the target printing operation, a malfunction is not likely to occur during printing of the printer unit 17.

The processing circuit 111 determines whether the sheet of paper relating to the printing operation to be executed is the target sheet of paper (ACT 4). In ACT 4, for example, the processing circuit 111 executes the plurality of printing operations in the job in order from the first printing operation. The processing circuit 111 determines whether the sheet of paper relating to the printing operation to be executed is the target sheet of paper. If the sheet of paper relating to the printing operation to be executed is the target sheet of paper, the printing operation to be executed is the target printing operation. If the sheet of paper relating to the printing operation to be executed is not the target sheet of paper, the printing operation to be executed is a printing operation other than the target printing operation.

If the sheet of paper relating to the printing operation to be executed is the target sheet of paper (ACT 4, YES), the process proceeds from ACT 4 to ACT 5. If the sheet of paper relating to the printing operation to be executed is not the target sheet of paper (ACT 4, NO), the process proceeds from ACT 4 to ACT 8.

If the sheet of paper relating to the printing operation to be executed is the target sheet of paper, the processing circuit 111 detects whether the first printing operation preceding the target printing operation is completed (ACT 5). If the processing circuit 111 does not detect the completion of the first printing operation (ACT 5, NO), the process of ACT 5 is continued. If the processing circuit 111 detects the completion of the first printing operation (ACT 5, YES), the process proceeds from ACT 5 to ACT 6. If the target printing operation is the first printing operation among the plurality of printing operations in the job, the process of ACT 5 is skipped.

The processing circuit 111 controls the printer unit 17 to execute the target printing operation after the completion of the first printing operation (ACT 6). In ACT 6, for example, the processing circuit 111 controls the printer unit 17 to start pick-up of the target sheet of paper after discharging the first sheet of paper. The printer unit 17 prints an image on the target sheet of paper based on image data after the pick-up of the target sheet of paper. The printer unit 17 discharges the printed target sheet of paper to the paper discharge tray 101.

The processing circuit 111 detects whether the target printing operation is completed (ACT 7). If the processing circuit 111 does not detect the completion of the target printing operation (ACT 7, NO), the process of ACT 7 is continued. If the processing circuit 111 detects the completion of the target printing operation (ACT 7, YES), the process proceeds from ACT 7 to ACT 9.

If the sheet of paper relating to the printing operation to be executed is not the target sheet of paper, the processing circuit 111 controls the printer unit 17 to execute the printing operation (ACT 8). Examples of a case where the sheet of paper relating to the printing operation to be executed is not the target sheet of paper include a case where the sheet of paper relating to the printing operation to be executed is the second sheet of paper. If the sheet of paper relating to the printing operation to be executed is the second sheet of paper, the printing operation to be executed is the second printing operation. Examples of a case where the sheet of paper relating to the printing operation to be executed is not the target sheet of paper include a case where the sheet of paper relating to the printing operation to be executed is a sheet of paper other than the target sheet of paper and the second sheet of paper. If the sheet of paper relating to the printing operation to be executed is neither the target sheet of paper nor the second sheet of paper, the printing operation to be executed is a printing operation other than the target printing operation and the second printing operation.

First, a case where the sheet of paper relating to the printing operation to be executed is the second sheet of paper will be described. Here, the processing circuit 111 processes ACT 8 after ACT 7. Therefore, the processing circuit 111 controls the printer unit 17 to execute the second printing operation after the completion of the target printing operation. For example, the processing circuit 111 controls the printer unit 17 to start pick-up of the second sheet of paper after discharging the target sheet of paper. The printer unit 17 prints an image on the second sheet of paper based on image data after the pick-up of the second sheet of paper. The printer unit 17 discharges the printed second sheet of paper to the paper discharge tray 101.

Next, a case where the sheet of paper relating to the printing operation to be executed is a sheet of paper other than the target sheet of paper and the second sheet of paper will be described. Here, the processing circuit 111 controls the printer unit 17 to execute the printing operation as usual. The printer unit 17 picks up the sheet of paper relating to the printing operation at a usual timing. The printer unit 17 prints an image on the sheet of paper based on image data after the pick-up of the sheet of paper. The printer unit 17 discharges the printed sheet of paper to the paper discharge tray 101.

The processing circuit 111 detects whether the job is completed (ACT 9). In ACT 9, for example, the processing circuit 111 detects whether the job is completed based on completion of the final printing operation among the plurality of printing operations in the job. If the processing circuit 111 detects the completion of the job (ACT 9, YES), the process ends. If the processing circuit 111 does not detect the completion of the job (ACT 9, NO), the process proceeds from ACT 9 to ACT 10.

If the processing circuit 111 does not detect the completion of the job, the processing circuit 111 prepares printing of the next sheet of paper (ACT 10). The process proceeds from ACT 10 to ACT 4.

In ACT 2, the example where the job includes the printing operation that matches the malfunction log is described. However, the embodiment is not limited thereto. The processing circuit 111 may process whether the job includes the printing operation relating to the malfunction log. In the example, the expression "the printing operation that matches the malfunction log" in the above description may be replaced with "the printing operation relating to the malfunction log". The printing operation relating to the malfunction log may include not only the printing operation that matches the malfunction log but also the printing operation that is similar to the malfunction log. The printing operation that is similar to the malfunction log is a printing operation including printing corresponding to printing conditions that are similar to the malfunction log. The printing conditions being similar to the malfunction log represents that the printing conditions are similar to the occurrence conditions represented by the malfunction log. A criterion based on which the printing conditions are determined to be similar to the occurrence conditions can be appropriately set. The criterion may be a criterion that the number of conditions in the printing conditions that match conditions in the occurrence conditions may be a predetermined number or more. The criterion may be a criterion that conditions in the printing conditions are similar to conditions in the occurrence conditions. The printing ratio will be described as an example. If the printing ratio in the printing conditions is within a predetermined value from the printing ratio in the occurrence conditions, the printing ratio in the printing conditions is similar to the printing ratio in the occurrence conditions.

As described above, if the job includes the target printing operation, the processing circuit 111 controls a start timing of at least one of the target printing operation and the second printing operation in the job. A case where the target printing operation is the first printing operation among the plurality of printing operations in the job will be described. Here, the processing circuit 111 controls the start timing of the second printing operation in the job. A case where the target printing operation is the final printing operation among the plurality of printing operations in the job will be described. Here, the processing circuit 111 controls the start timing of the target printing operation in the job. A case where the target printing operation is a printing operation other than the first printing operation and the final printing operation among the plurality of printing operations in the job will be described. Here, the processing circuit 111 controls the start timings of the target printing operation and the second printing operation in the job.

The printer unit 17 controls the start timing of at least one of the target printing operation and the second printing operation. Therefore, the target printing operation and the other printing operations are not executed simultaneously. That is, the printer unit 17 conveys only the target sheet of paper relating to the target printing operation in the image forming apparatus 1. Here, the target printing operation relates to the malfunction log. Therefore, a malfunction is likely to occur in the printer unit 17 during the execution of the target printing operation. However, even if the operation of the printer unit 17 stops due to the occurrence of the malfunction, the number of sheets of paper remaining in the image forming apparatus 1 is one. Therefore, the user can restore the image forming apparatus 1 by taking the minimum action of removing the one sheet of paper from the image forming apparatus 1. As such, the image forming apparatus 1 can reduce a workload on the user of removing paper from the image forming apparatus 1. In the image forming apparatus 1, by reducing the load, a period of time taken from the occurrence of the malfunction to the restoration of the image forming apparatus 1 can be reduced. The number of sheets of paper remaining in the image forming apparatus 1 is one, and thus the waste of paper can be reduced.

If the printer unit 17 executes a printing operation other than the target printing operation and the second printing operation, the printer unit 17 executes the printing operation as usual. Therefore, even if the job includes the target printing operation, a period of time taken from start to end of the job is prevented from being excessively long. Therefore, the convenience does not deteriorate.

Second Embodiment

A second embodiment is different from the first embodiment in that the image forming apparatus refers to data stored in a server.

Hereinafter, the second embodiment will be described using the drawings. In each of the drawings used for the description of the second embodiment, the scale of each of components may be appropriately changed. Each of the drawings in the following second embodiment may not illustrate a configuration for description. In the second embodiment, the same configurations as those of the first embodiment are represented by the same reference numerals, and the detailed description thereof will be omitted.

Figure 5:
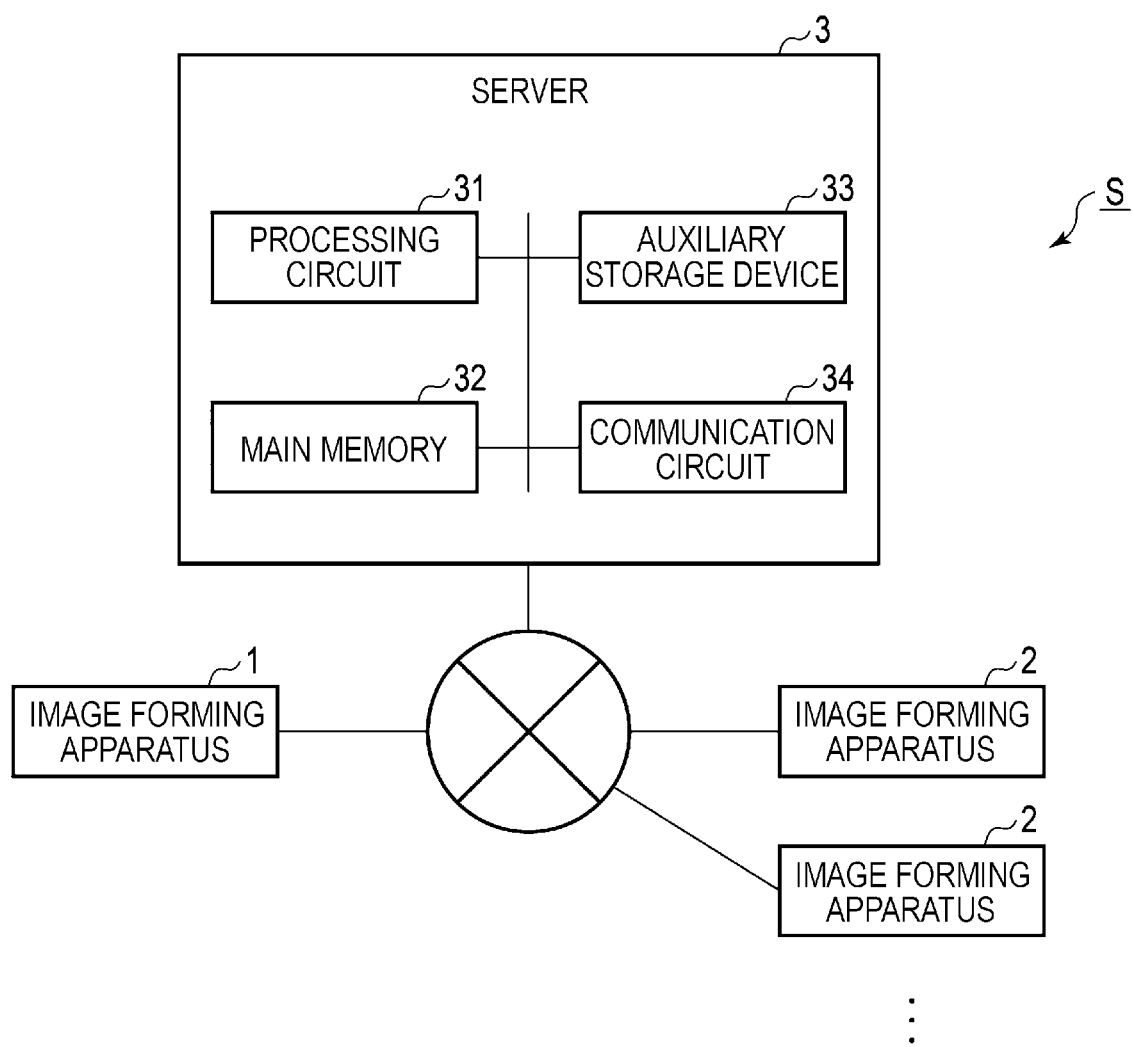
FIG. 5 is a diagram illustrating the summary of a configuration example of a system according to a second embodiment.

FIG. 5 is a diagram illustrating the summary of a configuration example of a system S.

The system S includes the image forming apparatus 1, a plurality of image forming apparatuses 2 different from the image forming apparatus 1, and a server 3. The image forming apparatus 1, the plurality of image forming apparatuses 2, and the server 3 are communicatively connected to each other via a network NW. The network NW includes one or more networks among various networks such as the Internet, a mobile communication network, or a LAN. The LAN may be a wireless LAN or a wired LAN. The system S may refer to a system including at least two apparatuses.

The image forming apparatus 1 is the same as that according to the first embodiment, the description thereof will be omitted.

The image forming apparatuses 2 have the same configuration as the image forming apparatus 1. The image forming apparatuses 2 are examples of other image forming apparatuses when seen from the image forming apparatus 1.

The server 3 is an apparatus that processes data forming apparatus 1 and the acquired from the image plurality of image forming apparatuses 2.

The server 3 includes a processing circuit 31, a main memory 32, an auxiliary storage device 33, and a communication circuit 34.

The processing circuit 31 corresponds to a central part of the server 3. The processing circuit 31 is an element configuring a computer of the server 3. The processing circuit 31 may have the same hardware configuration as the processing circuit 111. The processing circuit 31 loads a program stored in advance in the main memory 32 or the auxiliary storage device 33 on the main memory 32. The processing circuit 31 executes various processes by executing the program loaded on the main memory 32.

The main memory 32 corresponds to a main storage part of the server 3. The main memory 32 is an element configuring the computer of the server 3. The main memory 32 may have the same hardware configuration as the main memory 112.

The auxiliary storage device 33 corresponds to an auxiliary storage part of the server 3. The auxiliary storage device 33 may have the same hardware configuration as the auxiliary storage device 113. The auxiliary storage device 33 is an example of a storage device.

The auxiliary storage device 33 stores one or more malfunction logs in the image forming apparatus 1. Hereinafter, the malfunction log in the image forming apparatus 1 will also be simply referred to as the malfunction log. The auxiliary storage device 33 stores model information of the image forming apparatus 1 and usage information of the image forming apparatus 1 correlated with the malfunction log per malfunction log. The model information of the image forming apparatus is unique information with which the model of the image forming apparatus 1 is identifiable. The usage information of the image forming apparatus 1 is usage information from the start of the use of the image forming apparatus 1. For example, the usage information of the image forming apparatus 1 is the total number of printed sheets of paper from the start of use of the image forming apparatus 1. Whenever the processing circuit 31 acquires data including the malfunction log, the model information, and the usage information from the image forming apparatus 1 via the communication circuit 34, the processing circuit 31 stores the acquired data in the auxiliary storage device 33.

The auxiliary storage device 33 stores one or more malfunction logs for each of the plurality of image forming apparatuses 2. Hereinafter, the malfunction log in the image forming apparatus 2 will also be referred to as the other malfunction log. The other malfunction log is data representing occurrence conditions of malfunction in the image forming apparatus 2. The malfunction in the image forming apparatus 2 is an event that causes the image forming apparatus 2 to stop a printing operation. The other malfunction log is the same as the malfunction log in the image forming apparatus 1.

The auxiliary storage device 33 stores model information of the image forming apparatus 2 and usage information of the image forming apparatus 2 correlated with the other malfunction log per other malfunction log. The model information of the image forming apparatus 2 is unique information with which the model of the image forming apparatus 2 is identifiable. The usage information of the image forming apparatus 2 is usage information from the start of the use of the image forming apparatus 2. For example, the usage information of the image forming apparatus 2 is the total number of printed sheets of paper from the start of use of the image forming apparatus 2. Whenever the processing circuit 31 acquires data including the other malfunction log, the model information, and the usage information from the image forming apparatus 2 via the communication circuit 34, the processing circuit 31 stores the acquired data in the auxiliary storage device 33.

The plurality of image forming apparatuses 2 include one or more image forming apparatuses 2 being the same model as the model represented by the model information of the image forming apparatus 1. Therefore, the auxiliary storage device 33 stores the other malfunction logs in the one or more image forming apparatuses 2 being the same model as the model represented by the model information of the image forming apparatus 1. The plurality of image forming apparatuses 2 include one or more image forming apparatuses 2 having usage information of a threshold or more based on the usage information of the image forming apparatus 1. Therefore, the auxiliary storage device 33 stores the other malfunction logs in the one or more image forming apparatuses 2 having usage information of a threshold or more based on the usage information of the image forming apparatus 1. The threshold based on the usage information of the image forming apparatus 1 may be the usage information of the image forming apparatus 1. The threshold based on the usage information of the image forming apparatus 1 may be usage information that is less than the usage information of the image forming apparatus 1. The threshold based on the usage information of the image forming apparatus 1 may be usage information that is more than the usage information of the image forming apparatus 1.

The communication circuit 34 is an interface where the server 3 communicates with the image forming apparatus 1 or the image forming apparatus 2 via the network NW. The communication circuit 34 is an example of the communication interface.

A hardware configuration of the server 3 is not limited to the above-described configuration. For the server 3, the components described above can be removed or modified and new components can be added.

FIG. 6 is a diagram illustrating the summary of a data structure of data stored in the server 3.

The auxiliary storage device 113 stores the malfunction log, and the model information of the image forming apparatus 1 and the usage information of the image forming apparatus 1 correlated with the malfunction log. The malfunction log includes the printing ratio, the duplex/simplex printing, the paper size, the paper thickness, the position of the paper feed cassette, the paper discharge destination, the internal temperature, and the internal humidity. The auxiliary storage device 113 stores the other malfunction log, and the model information of the image forming apparatus 2 and usage information of the image forming apparatus 2 correlated with the other malfunction log. The other malfunction log includes the printing ratio, the duplex/simplex printing, the paper size, the paper thickness, the position of the paper feed cassette, the paper discharge destination, the internal temperature, and the internal humidity.

Figure 7:
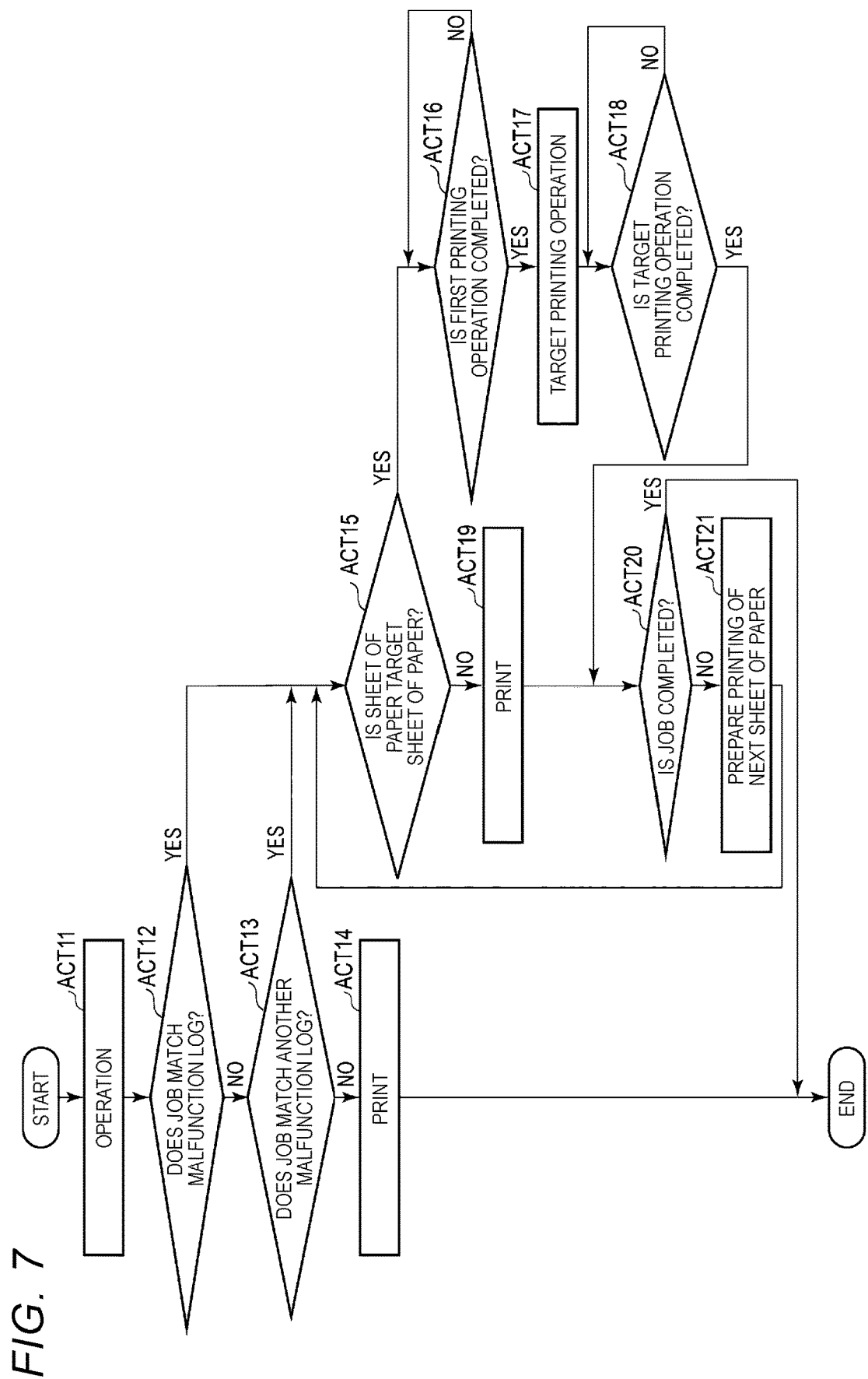
FIG. 7 is a flowchart illustrating an example of a process by an image forming apparatus.

FIG. 7 is a flowchart illustrating an example of a process by the image forming apparatus 1.

The procedure described below is merely exemplary and may be changed as long as each of the processes can be executed. In the procedure described below, steps can be omitted, replaced, and added depending on embodiments.

Here, a process of one job by the processing circuit 111 will be described.

The processing circuit 111 acquires the job based on the user operation (ACT 11). The process of ACT 11 is the same as the process of ACT 1.

The processing circuit 111 processes whether the job includes a printing operation that matches the malfunction log (ACT 12). The process of ACT 12 is the same as the process of ACT 2. The printing operation that matches the malfunction log is an example of a target printing operation. Hereinafter, the printing operation that matches the malfunction log will also be referred to as the target printing operation that matches the malfunction log. If the job does not include the target printing operation that matches the malfunction log (ACT 12, NO), the process proceeds from ACT 12 to ACT 13. If the job includes the target printing operation that matches the malfunction log (ACT 12, YES), the process proceeds from ACT 12 to ACT 15. In ACT 15 to ACT 21, the processing circuit 111 controls a start timing of at least one of the target printing operation that matches the malfunction log and the second printing operation following the target printing operation that matches the malfunction log in the job.

The processing circuit 111 processes whether the job includes the printing operation that matches the other malfunction log based on the communication with the server 3 via the communication circuit 14 (ACT 13). The printing operation that matches the other malfunction log is a printing operation including printing corresponding to printing conditions that match the other malfunction log. The printing conditions matching the other malfunction log represents that the printing conditions match the occurrence conditions represented by the other malfunction log. The printing operation that matches the other malfunction log is an example of the target printing operation. Hereinafter, the printing operation that matches the other malfunction log will also be referred to as the target printing operation that matches the other malfunction log.

In ACT 13, for example, the processing circuit 111 acquires printing conditions per page based on the acquisition of the job. The processing circuit 111 transmits the printing conditions per page, the model information of the image forming apparatus 1, and the usage information of the image forming apparatus 1 to the server 3 via the communication circuit 14. In response to the transmission, the processing circuit 111 receives determination information representing whether the other malfunction log that matches the printing conditions per page is present from the server 3 via the communication circuit 14. If the printing conditions that match the other malfunction log are present, the processing circuit 111 determines that the job includes the target printing operation that matches the other malfunction log. The job may include one target printing operation or may include a plurality of target printing operations. If the job includes a plurality of target printing operations, each of the target printing operations may match another malfunction log or may match different other malfunction logs. On the other hand, if the printing conditions that match the other malfunction log are not present, the processing circuit 111 determines that the job does not include the target printing operation that matches the other malfunction log.

Here, the process of the server 3 will be described. The processing circuit 31 receives the printing conditions per page, the model information of the image forming apparatus 1, and the usage information of the image forming apparatus 1 from the image forming apparatus 1 via the communication circuit 34. The processing circuit 31 compares the printing conditions per page to one or more other malfunction logs stored in the auxiliary storage device 33 based on the received printing conditions per page.

The processing circuit 31 may limit the other malfunction logs to be compared to the printing conditions per page based on the received model information of the image forming apparatus 1. In the example, the processing circuit 31 compares the printing conditions per page to the other malfunction logs in the one or more image forming apparatuses 2 being the same model as the model represented by the model information of the image forming apparatus 1. Even if the malfunction that occurs in the image forming apparatus 2 does not occur in the image forming apparatus 1, the malfunction is likely to occur in the image forming apparatus 1 in the future. The image forming apparatus 1 can appropriately process the job by detecting the target printing operation that matches the other malfunction log in the image forming apparatus 2.

The processing circuit 31 may limit the other malfunction logs to be compared to the printing conditions per page based on the received usage information of the image forming apparatus 1. In the example, the processing circuit 31 compares the printing conditions per page to the other malfunction logs in the one or more image forming apparatuses 2 having usage information of a threshold or more based on the usage information of the image forming apparatus 1. Even if the malfunction that occurs in the image forming apparatus 2 does not occur in the image forming apparatus 1, the malfunction is likely to occur in the image forming apparatus 1 in the future. The image forming apparatus 1 can appropriately process the job by detecting the target printing operation that matches the other malfunction log in the image forming apparatus 2.

It is preferable that the processing circuit 31 limits the other malfunction log to be compared to the printing conditions per page by combining the two above-described examples. In the example, the processing circuit 31 compares the printing conditions per page to the other malfunction logs in one or more image forming apparatuses 2 being the same model as the image forming apparatus 1 and having usage information of a threshold or more based on the usage information of the image forming apparatus 1.

The processing circuit 31 determines whether the other malfunction log that matches the printing conditions is present per page. The processing circuit 31 generates determination information per page based on the determination per page. The processing circuit 31 transmits the generated determination information per page to the image forming apparatus 1 via the communication circuit 34.

If the job does not include the target printing operation that matches the other malfunction log (ACT 13, NO), the process proceeds from ACT 13 to ACT 14. If the job includes the target printing operation that matches the other malfunction log (ACT 13, YES), the process proceeds from ACT 13 to ACT 15. In ACT 15 to ACT 21, the processing circuit 111 controls a start timing of at least one of the target printing operation that matches the other malfunction log and the second printing operation following the target printing operation that matches the other malfunction log in the job.

If the job does not include the target printing operation, the processing circuit 111 controls the printer unit 17 to execute a plurality of printing operations in the job as usual (ACT 14). The process of ACT 14 is the same as the process of ACT 3.

The processing circuit 111 determines whether the sheet of paper relating to the printing operation to be executed is the target sheet of paper (ACT 15). The process of ACT 15 is the same as the process of ACT 4. If the sheet of paper relating to the printing operation to be executed is the target sheet of paper, the printing operation to be executed is the target printing operation that matches the malfunction log or the target printing operation that matches the other malfunction log. If the sheet of paper relating to the printing operation to be executed is not the target sheet of paper, the printing operation to be executed is a printing operation other than the target printing operation that matches the malfunction log and the target printing operation that matches the other malfunction log.

If the sheet of paper relating to the printing operation to be executed is the target sheet of paper (ACT 15, YES), the process proceeds from ACT 15 to ACT 16. If the sheet of paper relating to the printing operation to be executed is not the target sheet of paper (ACT 15, NO), the process proceeds from ACT 15 to ACT 19.

If the sheet of paper relating to the printing operation to be executed is the target sheet of paper, the processing circuit 111 detects whether the first printing operation preceding the target printing operation is completed (ACT 16). If the processing circuit 111 does not detect the completion of the first printing operation (ACT 16, NO), the process of ACT 16 is continued. If the processing circuit 111 detects the completion of the first printing operation (ACT 16, YES), the process proceeds from ACT 16 to ACT 17. If the target printing operation is the first printing operation among the plurality of printing operations in the job, the process of ACT 16 is skipped.

The processing circuit 111 controls the printer unit 17 to execute the target printing operation after the completion of the first printing operation (ACT 17). The process of ACT 17 is the same as the process of ACT 6.

The processing circuit 111 detects whether the target printing operation is completed (ACT 18). If the processing circuit 111 does not detect the completion of the target printing operation (ACT 18, NO), the process of ACT 18 is continued. If the processing circuit 111 detects the completion of the target printing operation (ACT 18, YES), the process proceeds from ACT 18 to ACT 20.

If the sheet of paper relating to the printing operation to be executed is not the target sheet of paper, the processing circuit 111 controls the printer unit 17 to execute the printing operation (ACT 19). The process of ACT 19 is the same as the process of ACT 8.

The processing circuit 111 detects whether the job is completed (ACT 20). The process of ACT 20 is the same as the process of ACT 9. If the processing circuit 111 detects the completion of the job (ACT 20, YES), the process ends. If the processing circuit 111 does not detect the completion of the job (ACT 20, NO), the process proceeds from ACT 20 to ACT 21.

If the processing circuit 111 does not detect the completion of the job, the processing circuit 111 prepares printing of the next sheet of paper (ACT 21). The process proceeds from ACT 21 to ACT 15.

In ACT 12, the example where the job includes the printing operation that matches the malfunction log is described. However, the embodiment is not limited thereto. The processing circuit 111 may process whether the job includes the printing operation relating to the malfunction log. The printing operation relating to the malfunction log is an example of the target printing operation. In the example, the expression "the target printing operation that matches the malfunction log" in the above description may be replaced with "the target printing operation relating to the malfunction log".

In ACT 13, the example where the job includes the printing operation that matches the other malfunction log is described. However, the embodiment is not limited thereto. The processing circuit 111 may process whether the job includes the printing operation relating to the other malfunction log. The printing operation relating to the other malfunction log may include not only the printing operation that matches the other malfunction log but also the printing operation that is similar to the other malfunction log. The printing operation that is similar to the other malfunction log is the same as the printing operation that is similar to the malfunction log. The printing operation relating to the other malfunction log is an example of the target printing operation. In the example, the expression "the target printing operation that matches the other malfunction log" in the above description may be replaced with "the target printing operation relating to the other malfunction log".

Even if the job includes the target printing operation that matches the malfunction log in ACT 12, the processing circuit 111 may execute the process of ACT 13. In the example, the job may include not only one or more target printing operations relating to the malfunction log but also one or more target printing operations relating to the other malfunction log.

The process of ACT 12 may be skipped.

As described above, if the job includes the target printing operation relating to the other malfunction log, the processing circuit 111 controls a start timing of at least one of the target printing operation relating to the other malfunction log and the second printing operation following the target printing operation relating to the other malfunction log in the job.

The target printing operation relates to the other malfunction log. Therefore, even if a malfunction does not occur in the image forming apparatus 1, a malfunction is likely to occur in the printer unit 17 during the execution of the target printing operation. Therefore, the printer unit 17 does not simultaneously execute the target printing operation and the other printing operations by controlling the start timing.

Other Embodiments

The above-described embodiments may be applied to not only the apparatus but also a method that is executed by the apparatus. The above-described embodiments may be applied to a program that causes a computer of the apparatus to execute each of the functions. The above-described embodiments may be applied to a recording medium that stores the program.

The program may be transferred in a state where the program is stored in the apparatus according to the embodiment or may be transferred in a state where the program is not stored in the apparatus. In the latter case, the program may be transferred via a network or may be transferred in a state where the program is recorded in a recording medium. The recording medium is a non-transitory tangible medium. The recording medium is a computer-readable medium. The form of the recording medium is not limited as long as it is a medium such as a CD-ROM or a memory card that can store the program and can be read by a computer.

While certain embodiments have been described, these embodiments have been presented by way of example only, and are not intended to limit the scope of the disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

SUPPLEMENTARY

The above-described embodiments may be expressed as follows.

(1) An image forming apparatus including:
a storage device configured to store a malfunction log in the image forming apparatus; and
a processing circuit configured to control, if a job includes an operation relating to the malfunction log, a start timing of at least one of the operation and a next operation following the operation in the job.

(2) The apparatus according to (1), in which
the control includes execution of the operation after completion of a previous operation preceding the operation in the job.

(3) The apparatus according to (2), in which
the previous operation preceding the operation includes discharge of a printed sheet,
the operation includes pick-up of a sheet before printing, and
the execution of the operation includes starting the pick-up of the sheet before printing relating to the operation after the discharge of the printed sheet relating to the previous operation preceding the operation.

(4) The apparatus according to any one of (1) to (3), in which
the control includes execution of the next operation following the operation after completion of the operation.

(5) The apparatus according to (4), in which
the operation includes discharge of a printed sheet,
the next operation following the operation includes pick-up of a sheet before printing, and
the execution of the next operation following the operation includes starting the pick-up of the sheet before printing relating to the next operation following the operation after the discharge of the printed sheet relating to the operation.

(6) The apparatus according to any one of (1) to (5), in which
the operation relating to the malfunction log is an operation that matches the malfunction log.

(7) The apparatus according to any one of (1) to (6), further including a communication interface configured to communicate with a server that stores other malfunction log in other image forming apparatus different from the image forming apparatus, in which
if the job does not include the operation relating to the malfunction log, the processing circuit processes whether the job includes an operation relating to the other malfunction log based on communication with the server via the communication interface, and if the job includes the operation relating to the other malfunction log, the processing circuit controls a start timing of at least one of the operation relating to the other malfunction log and a next operation following the operation relating to the other malfunction log in the job.

(8) The apparatus according to (7), in which
the other image forming apparatus is the same model as the image forming apparatus.

(9) The apparatus according to (7) or (8), in which
the other image forming apparatus is an apparatus having usage information of a threshold or more based on usage information of the image forming apparatus.

(10) A control method of an image forming apparatus communicating with a server that stores a malfunction log in other image forming apparatus different from the image forming apparatus, the method including:
processing whether a job includes an operation relating to the malfunction log based on communication with the server; and
controlling, if the job includes the operation relating to the malfunction log, a start timing of at least one of the operation and a next operation following the operation in the job.

What is claimed is:

1. An image forming apparatus comprising:
a storage configured to store a malfunction log relating to the image forming apparatus; and
a processing circuit configured to control, when a job includes an operation relating to the malfunction log, a start timing of at least one of the operation or a next operation following the operation in the job.

2. The apparatus according to claim 1, wherein
the control includes execution of the operation after completion of a previous operation preceding the operation in the job.

3. The apparatus according to claim 2, wherein
the previous operation preceding the operation includes discharge of a printed sheet,
the operation includes pick-up of a sheet before printing, and
the execution of the operation includes starting the pick-up of the sheet before printing relating to the operation after the discharge of the printed sheet.

4. The apparatus according to claim 1, wherein
the control includes execution of the next operation following the operation, after completion of the operation.

5. The apparatus according to claim 4, wherein
the operation includes discharge of a printed sheet,
the next operation following the operation includes pick-up of a sheet before printing, and
the execution of the next operation following the operation includes starting the pick-up of the sheet before printing relating to the next operation following the operation after the discharge of the printed sheet.

6. The apparatus according to claim 1, wherein
the operation relating to the malfunction log is an operation that matches the malfunction log.

7. The apparatus according to claim 1, further comprising a communication interface configured to communicate with a server that stores an other malfunction log in an other image forming apparatus different from the image forming apparatus, wherein
when the job does not include the operation relating to the malfunction log, the processing circuit processes whether the job includes an operation relating to the other malfunction log based on communication with the server via the communication interface, and when the job includes the operation relating to the other malfunction log, the processing circuit controls a start timing of at least one of the operation relating to the other malfunction log or a next operation following the operation relating to the other malfunction log in the job.

8. The apparatus according to claim 7, wherein
the other image forming apparatus is a same type as the image forming apparatus.

9. The apparatus according to claim 7, wherein
the other image forming apparatus is an apparatus having usage information of at least a threshold based on usage information of the image forming apparatus.

10. The apparatus according to claim 1, wherein the malfunction log includes data representing occurrence conditions of malfunction in the image forming apparatus.

11. The apparatus according to claim 1, wherein the malfunction log includes at least one of a printing ratio, a duplex/simplex printing, a paper size, a paper thickness, a position of a paper feed cassette, a paper discharge destination, an internal temperature, or an internal humidity.

12. A control method of an image forming apparatus communicating with a server that stores a malfunction log in an other image forming apparatus different from the image forming apparatus, the method comprising:
processing, based on communication with the server, whether a job includes an operation relating to the malfunction log; and
controlling, when the job includes the operation relating to the malfunction log, a start timing of at least one of the operation or a next operation following the operation in the job.

13. A method of operating an image forming apparatus comprising a storage configured to store a malfunction log relating to the image forming apparatus, the method comprising:
controlling, when a job includes an operation relating to the malfunction log, a start timing of at least one of the operation or a next operation following the operation in the job.

14. The method according to claim 13, wherein
the controlling includes execution of the operation after completion of a previous operation preceding the operation in the job.

15. The method according to claim 14, wherein
the previous operation preceding the operation includes discharge of a printed sheet,
the operation includes pick-up of a sheet before printing, and
the execution of the operation includes starting the pick-up of the sheet before printing relating to the operation after the discharge of the printed sheet.

16. The method according to claim 13, wherein
the controlling includes execution of the next operation following the operation, after completion of the operation.

* * * * *